(12) United States Patent
Allard et al.

(10) Patent No.: US 11,065,842 B2
(45) Date of Patent: Jul. 20, 2021

(54) STRUCTURAL PANEL FOR AN APPLIANCE HAVING STAMPED COMPONENTS AND METHOD THEREFOR

(71) Applicant: WHIRLPOOL CORPORATION, Benton Harbor, MI (US)

(72) Inventors: Paul B. Allard, Coloma, MI (US); Lakshya J. Deka, Mishawaka, IN (US); Eric J. Dherde, St. Joseph, MI (US); Gustavo Frattini, St. Joseph, MI (US); Alberto R. Gomes, St. Joseph, MI (US); Lynne F. Hunter, Dorr, MI (US); Dustin M. Miller, South Bend, IN (US); Abhay Naik, Stevensville, MI (US); Karen J. Querfurth, Coloma, MI (US); Jerry M. Visin, Benton Harbor, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 177 days.

(21) Appl. No.: 16/308,979

(22) PCT Filed: Sep. 28, 2016

(86) PCT No.: PCT/US2016/054121
§ 371 (c)(1),
(2) Date: Dec. 11, 2018

(87) PCT Pub. No.: WO2018/063182
PCT Pub. Date: Apr. 5, 2018

(65) Prior Publication Data
US 2019/0308393 A1    Oct. 10, 2019

(51) Int. Cl.
*B32B 3/10*    (2006.01)
*B32B 15/00*    (2006.01)
(Continued)

(52) U.S. Cl.
CPC ............... *B32B 15/00* (2013.01); *B32B 7/12* (2013.01); *B32B 15/08* (2013.01); *F25D 23/02* (2013.01);
(Continued)

(58) Field of Classification Search
None
See application file for complete search history.

(56) References Cited

U.S. PATENT DOCUMENTS

| 2,114,880 A | 4/1938 | King |
| 4,583,796 A | 4/1986 | Nakajima et al. |

(Continued)

FOREIGN PATENT DOCUMENTS

| DE | 102011079209 |  | 1/2013 | |
| DE | 102011079209 A1 | * | 1/2013 | ........... F25D 23/085 |

(Continued)

OTHER PUBLICATIONS

Machine translation of de102011079209 (Year: 2011).*

*Primary Examiner* — Christopher M Polley
(74) *Attorney, Agent, or Firm* — Price Heneveld LLP (57) ABSTRACT

An operable panel for an appliance includes a metallic outer wrapper having a perimetrical wrapper edge that partially defines a perimetrical breaker channel, an inner liner and a plurality of corner brackets disposed proximate the perimetrical wrapper edge. Each corner bracket cooperates with the perimetrical wrapper edge to fully define the perimetrical breaker channel. A trim breaker is adhered to the metallic outer wrapper and the corner brackets at the perimetrical breaker channel and having a liner channel that receives a portion of the inner liner. The trim breaker extends between the inner liner and the outer wrapper. An insulation material is disposed within an insulating cavity defined between the inner liner and the outer wrapper.

8 Claims, 9 Drawing Sheets

(51) Int. Cl.
  *F25D 23/02* (2006.01)
  *F25D 23/08* (2006.01)
  *B32B 7/12* (2006.01)
  *B32B 15/08* (2006.01)
  B29C 65/72 (2006.01)
  F25D 23/06 (2006.01)
  B32B 7/08 (2019.01)

(52) U.S. Cl.
  CPC ............ *F25D 23/085* (2013.01); *B29C 65/72* (2013.01); *B32B 7/08* (2013.01); *B32B 2509/00* (2013.01); *F25D 23/021* (2013.01); *F25D 23/064* (2013.01); *F25D 23/08* (2013.01); *F25D 2201/14* (2013.01); *Y10T 428/24777* (2015.01)

(56) References Cited

U.S. PATENT DOCUMENTS

| | | |
|---|---|---|
| 5,588,731 A | 12/1996 | Schmidt et al. |
| 5,599,081 A | 2/1997 | Revlett et al. |
| 6,725,624 B2 | 4/2004 | Hirath |
| 9,074,405 B2 | 7/2015 | Shim et al. |
| 9,279,609 B2 | 3/2016 | Kim et al. |
| 9,303,915 B2 | 4/2016 | Kim et al. |
| 2011/0095669 A1 | 4/2011 | Moon et al. |
| 2014/0346942 A1 | 11/2014 | Kim et al. |
| 2015/0145399 A1 | 5/2015 | Joo et al. |
| 2015/0241114 A1 | 8/2015 | Wu |
| 2016/0258671 A1* | 9/2016 | Allard ................... F25D 23/085 |

FOREIGN PATENT DOCUMENTS

| | | |
|---|---|---|
| WO | 2007106067 | 9/2007 |
| WO | 2011081279 | 7/2011 |
| WO | 2016141021 | 9/2016 |

\* cited by examiner

STRUCTURAL PANEL FOR AN APPLIANCE HAVING STAMPED COMPONENTS AND METHOD THEREFOR

FIELD OF THE DEVICE

The device is in the field of insulation structures for appliances, and more specifically, a multi-component structural panel for an appliance having at least one stamped component.

SUMMARY

In at least one aspect, an operable panel for an appliance includes a metallic outer wrapper having a perimetrical wrapper edge that partially defines a perimetrical breaker channel, an inner liner and a plurality of corner brackets disposed proximate the perimetrical wrapper edge. Each corner bracket cooperates with the perimetrical wrapper edge to define the perimetrical breaker channel. A trim breaker is adhered to the metallic outer wrapper and the corner brackets at the perimetrical breaker channel and includes a liner channel that receives a portion of the inner liner. The trim breaker extends between the inner liner and the outer wrapper. An insulation material is disposed within an insulating cavity defined between the inner liner and the outer wrapper.

In at least another aspect, a method for forming a vacuum insulated structure for an appliance includes stamping a first metallic sheet into a flat liner pattern that corresponds to an inner liner for an appliance. The inner liner has a plurality of liner walls and a perimetrical liner tab. The flat liner pattern is shaped into the inner liner. A second metallic sheet is stamped into a flat wrapper pattern that corresponds to an outer wrapper for an appliance. The outer wrapper has a plurality of wrapper walls and a perimetrical wrapper edge. The flat wrapper pattern is shaped into the outer wrapper. A trim breaker is formed having a liner channel and a wrapper channel. The perimetrical liner tab and the perimetrical wrapper edge are secured with the liner and wrapper channels, respectively. An insulating material is disposed within an insulating cavity formed between the inner liner and the outer wrapper.

In at least another aspect, a method for forming a vacuum insulated structure for an appliance includes forming a first planar sheet into an inner liner. A second planar sheet is formed into an outer wrapper having a plurality of wrapper walls and a wrapper edge that at least partially defines a perimetrical breaker channel. A trim breaker is formed having a liner channel for receiving a portion of the inner liner and a wrapper channel for seating within the perimetrical breaker channel. The inner liner is secured within the liner channel and the wrapper channel is placed within the perimetrical breaker channel. An insulating material is disposed within an insulating cavity formed between the inner liner and the outer wrapper.

These and other features, advantages, and objects of the present device will be further understood and appreciated by those skilled in the art upon studying the following specification, claims, and appended drawings.

DETAILED DESCRIPTION OF EMBODIMENTS

Figure 1:
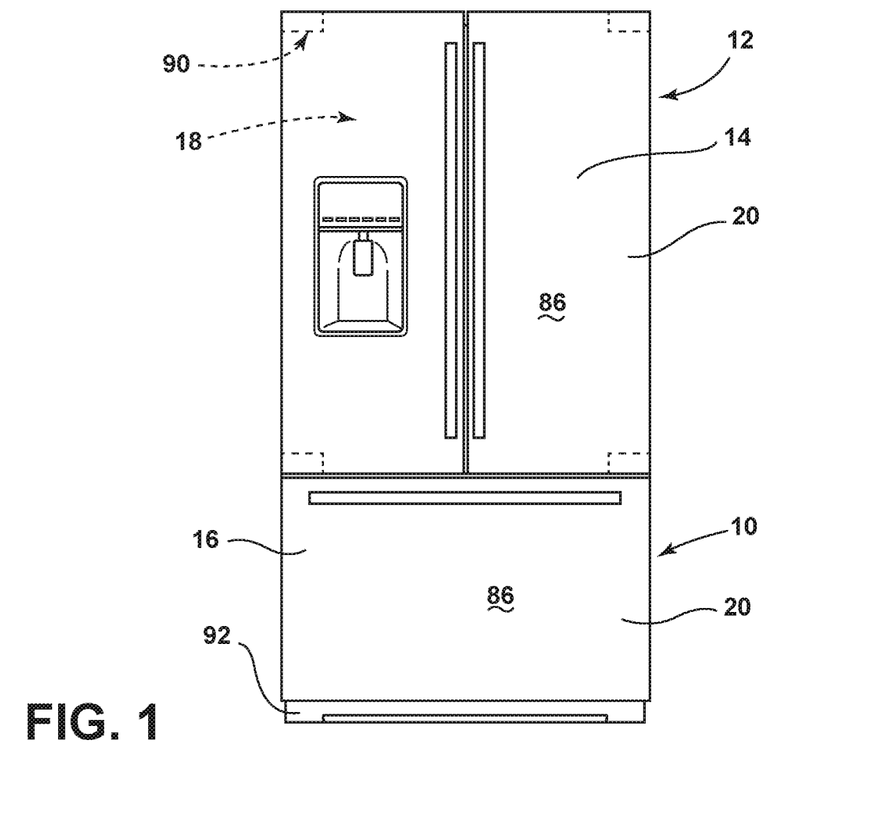
FIG. 1 is a front elevational view of an appliance having operable panels that are formed using an aspect of the method for forming a vacuum insulated structure.
Figure 2:
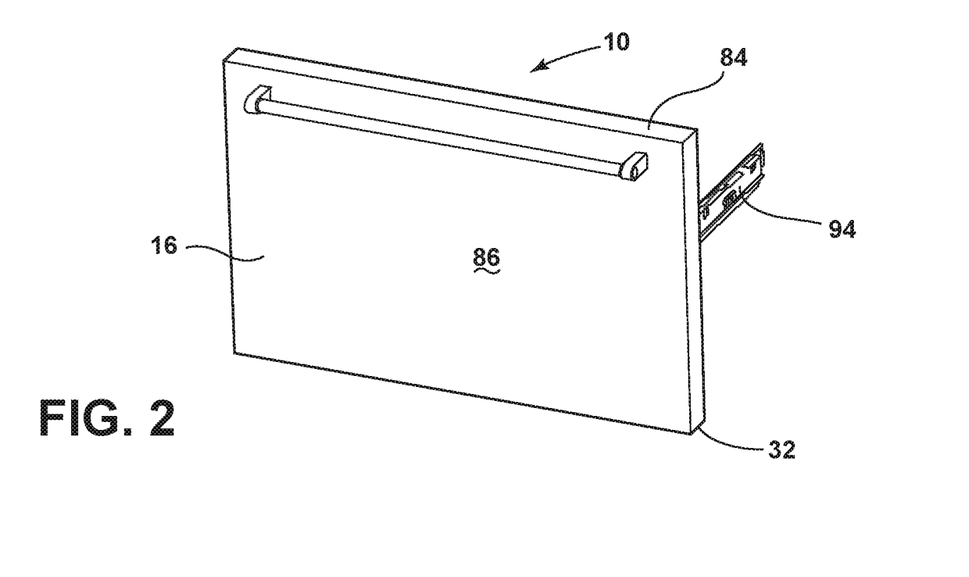
FIG. 2 is a front perspective view of the drawer panel of the appliance of FIG. 1.
Figure 3:
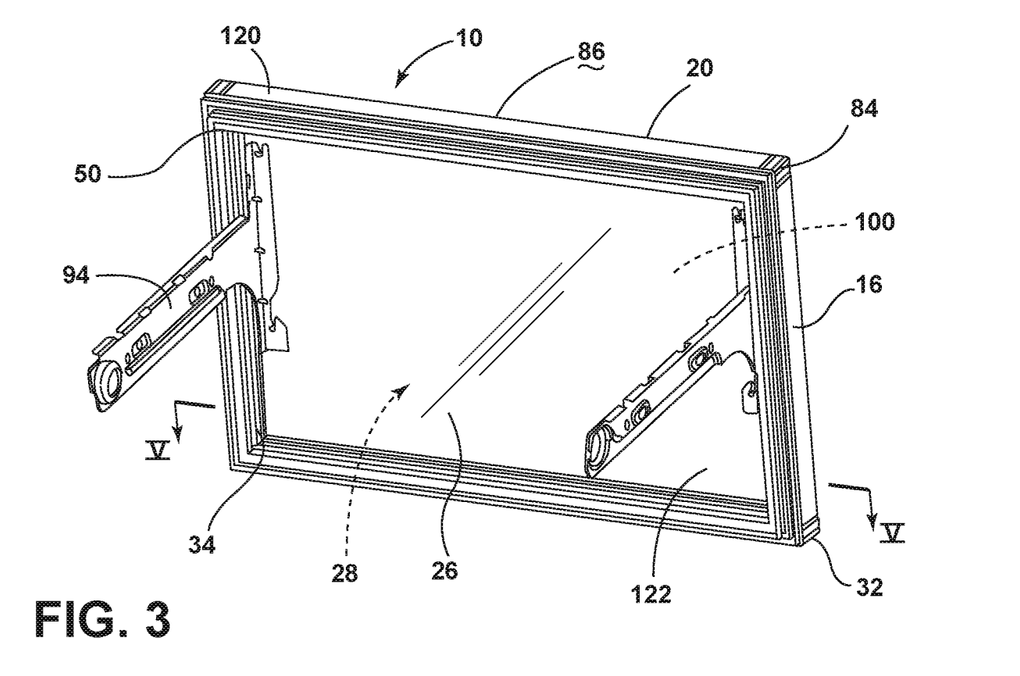
FIG. 3 is a rear perspective view of the drawer panel of FIG. 2.
Figure 4:
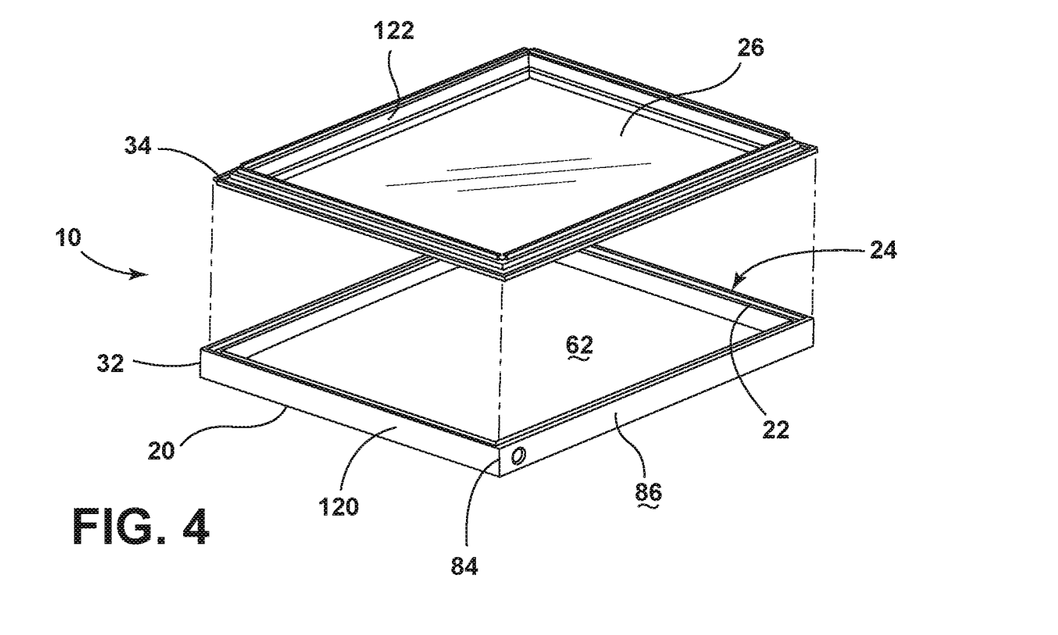
FIG. 4 is an exploded perspective view of the drawer panel of FIG. 3 with the drawer glides removed.
Figure 5:
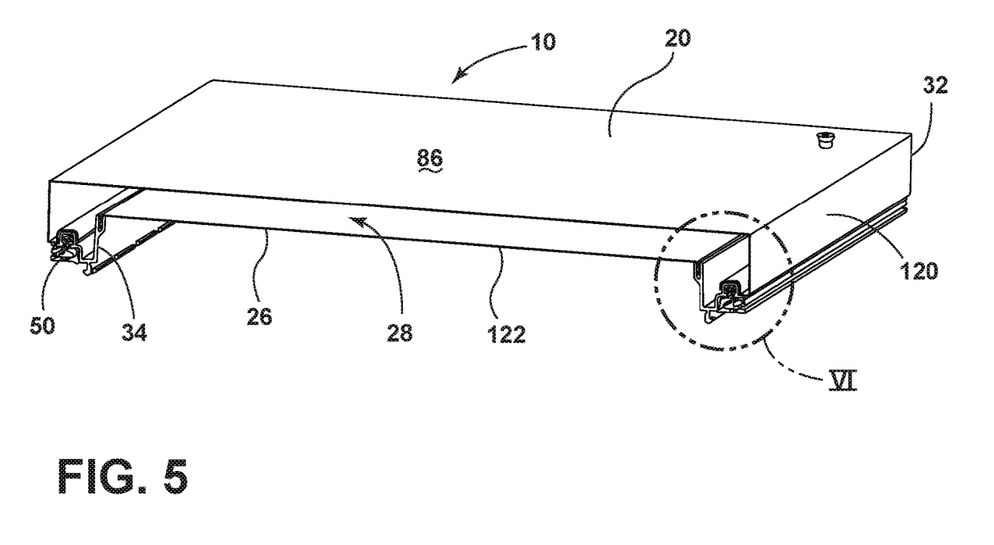
FIG. 5 is a cross-sectional view of the drawer panel of FIG. 3 taken along line V-V.
Figure 6:
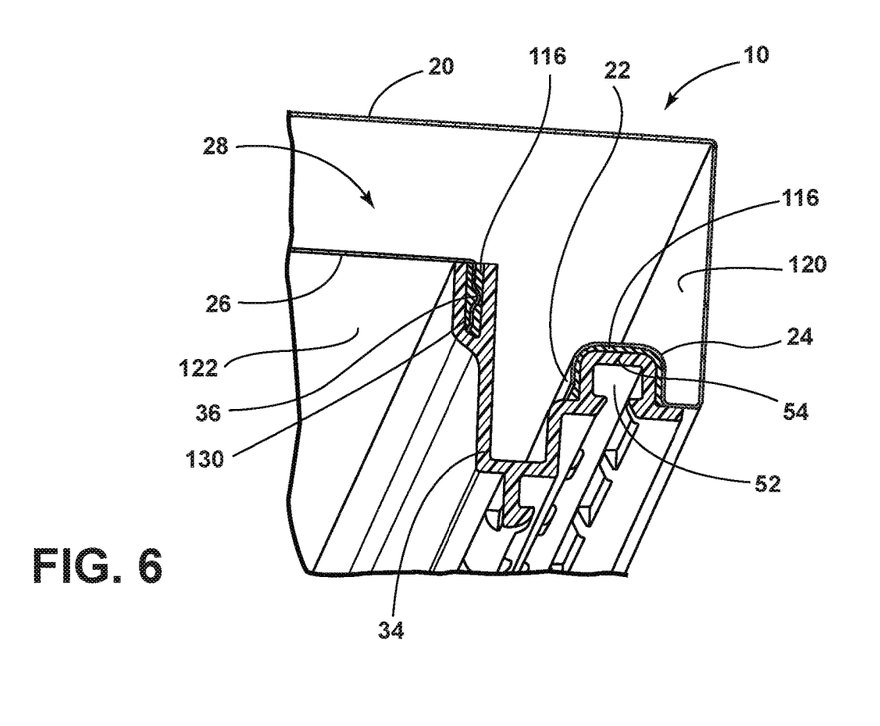
FIG. 6 is an enlarged cross-sectional view of the drawer panel of FIG. 5 taken at area VI, with the gasket removed.
Figure 7:
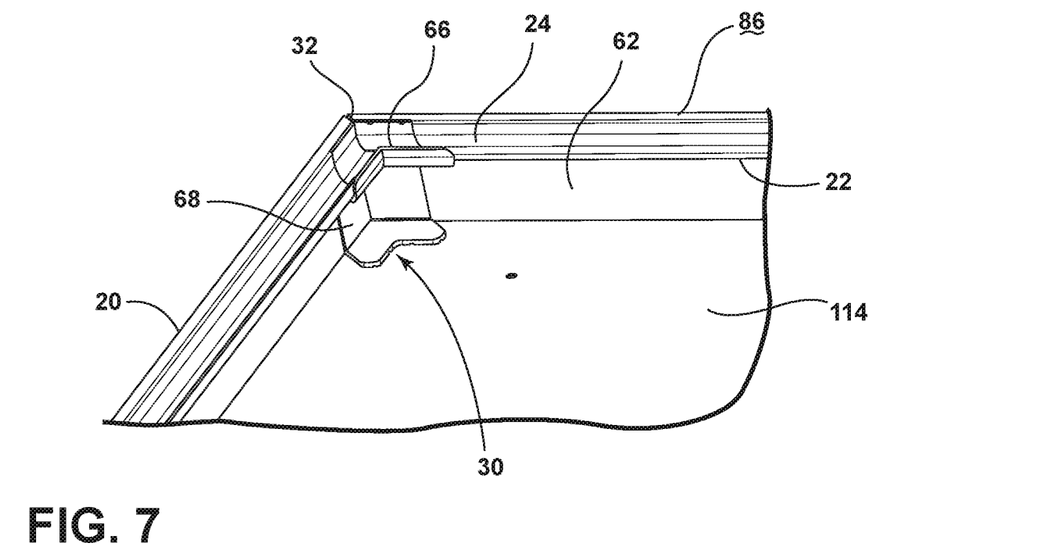
FIG. 7 is an enlarged perspective view of the drawer panel.
Figure 8:
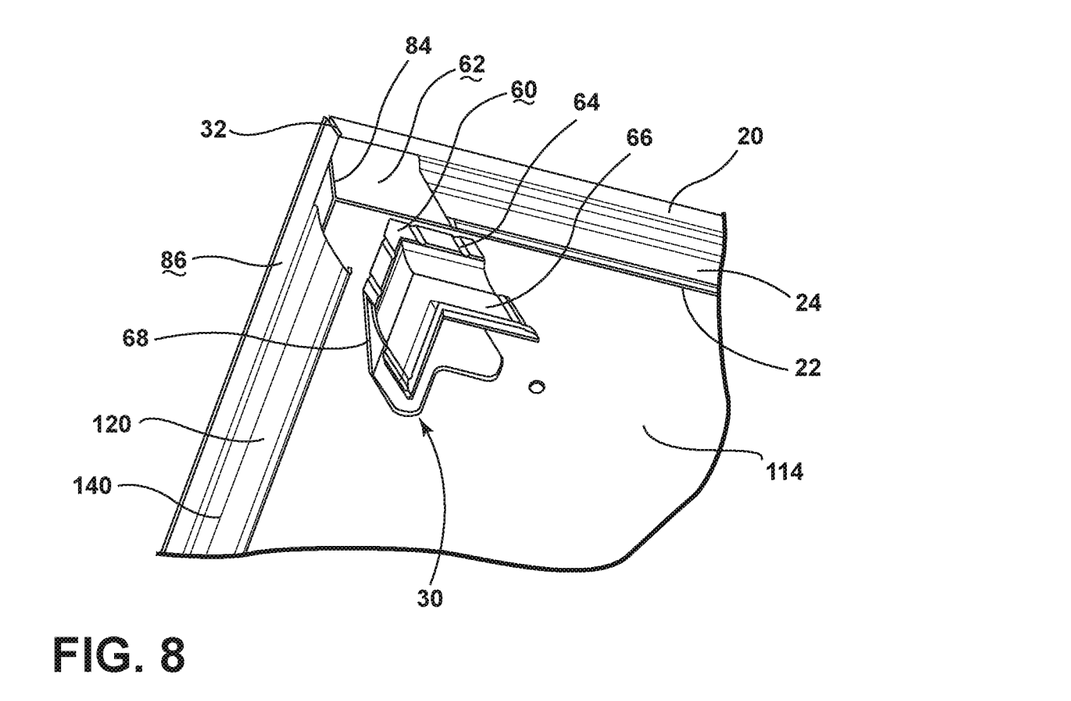
FIG. 8 is a partially exploded perspective view of the outer wrapper of FIG. 7.
Figure 9:
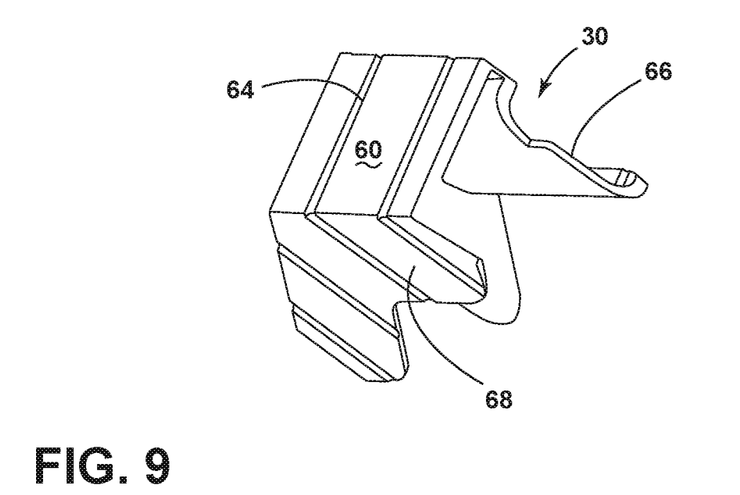
FIG. 9 is a perspective view of the corner bracket of FIG. 8.
Figure 10:
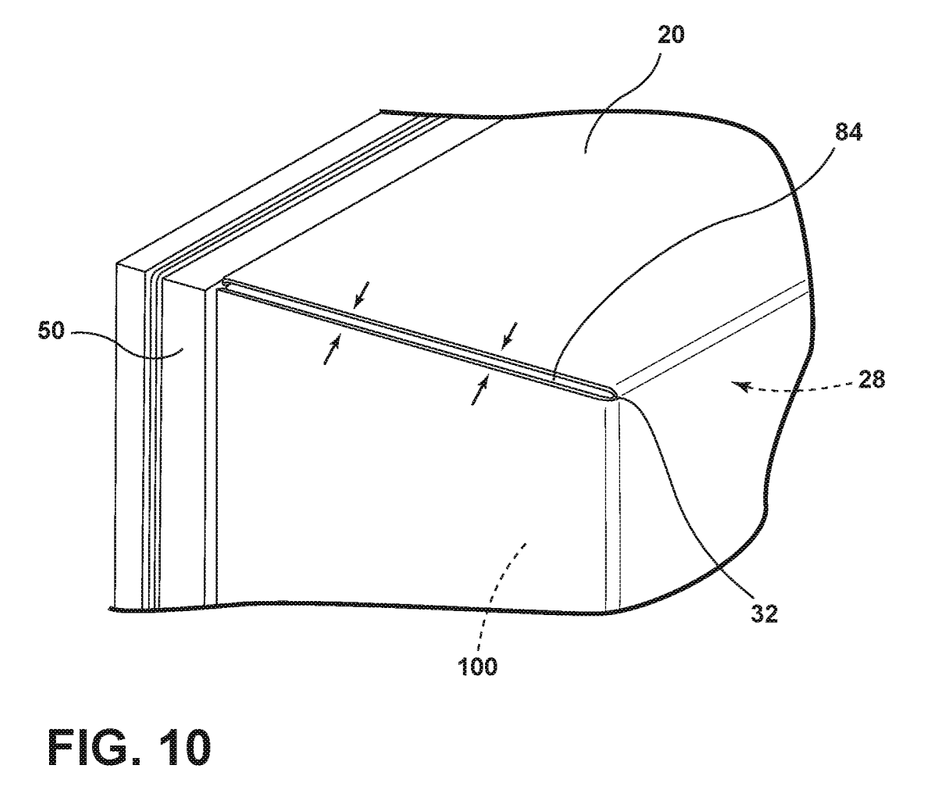
FIG. 10 is an enlarged perspective view of the corner detail of the drawer panel of FIG. 3.

For purposes of description herein the terms "upper," "lower," "right," "left," "rear," "front," "vertical," "horizontal," and derivatives thereof shall relate to the device as oriented in FIG. 1. However, it is to be understood that the device may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As illustrated in FIGS. 1-6, reference numeral 10 generally refers to an operable panel for an appliance 12, where the operable panel 10 can be in the form of a rotating door 14 or a slidable drawer 16 for the appliance 12 to define open and closed positions of various interior compartments 18 of the appliance 12. According to the various aspects of the device, the operable panel 10 for the appliance 12 can include a metallic outer wrapper 20 having a perimetrical wrapper edge 22 that partially defines a perimetrical breaker channel 24. The operable panel 10 can also include an inner liner 26. It is contemplated that the metallic outer wrapper 20 and the inner liner 26 can be coupled together to define an insulating cavity 28 therebetween. A plurality of corner brackets 30 can be disposed proximate the perimetrical wrapper edge 22, where each corner bracket 30 cooperates with the perimetrical wrapper edge 22 to fully define the perimetrical breaker channel 24 of the outer wrapper 20. Typically, the corner brackets 30 will be disposed in the outer corners 32 of the outer wrapper 20, such that where the operable panel 10 is rectangular, four corner brackets 30 will be disposed in each of the four outer corners 32 of the outer wrapper 20. A trim breaker 34 is adhered to the metallic outer wrapper 20 and the corner brackets 30 at the perimetrical breaker channel 24. The trim breaker 34 includes a liner channel 36 that receives a portion of the inner liner 26. The trim breaker 34 is adapted to extend between the inner liner 26 and the outer wrapper 20 to substantially seal the edges of the outer wrapper 20 and the inner liner 26 and enclose the insulating cavity 28 defined therebetween. The trim breaker 34 is adapted to engage the perimetrical breaker channel 24 defined by the outer wrapper 20 and the plurality of corner brackets 30.

Referring again to FIGS. 3-8, a flexible gasket 50 can be disposed within a gasket channel 52 defined within the trim breaker 34. It is contemplated that the gasket channel 52 is positioned proximate a wrapper channel 54 that is adapted to be disposed within the perimetrical breaker channel 24. The wrapper channel 54 of the trim breaker 34 is adapted to seat within the perimetrical breaker channel 24 of the outer wrapper 20 and the corner brackets 30. It is contemplated that the trim breaker 34 can include a U-shaped channel that defines each of the wrapper channel 54 and the gasket channel 52. In such an embodiment, one surface of the U-shaped channel of the trim breaker 34 defines the wrapper channel 54 and the opposing surface of the U-shaped channel defines the gasket channel 52. Accordingly, it is contemplated that the outward extending surface of the U-shaped channel can define the wrapper channel 54 that seats within the perimetrical breaker channel 24 of the metallic outer wrapper 20. Conversely, the inwardly extending surface of the U-shaped channel is adapted to receive a portion of the gasket 50 such that the gasket 50 seats within the gasket channel 52 of the trim breaker 34. Through the use of the U-shaped channel, it is contemplated that at least a portion of the gasket 50 can be positioned and supported within the channel volume defined by the perimetrical breaker channel 24 of the metallic outer wrapper 20 and the corner brackets 30.

Referring now to FIGS. 2-9, it is contemplated that the various corner brackets 30 can include an outer engagement surface 60 that engages an interior surface 62 of the outer wrapper 20 at each of the outer corners 32. Each corner bracket 30 can include a plurality of adhesion grooves 64 defined within the engagement surface 60. Each of these adhesion grooves 64 can serve to retain an adhesive 116 therein such that when the engagement surface 60 of the corner bracket 30 engages the interior surface 62 of the outer wrapper 20, adhesive 116 disposed within each of the adhesion grooves 64 can serve to apply the adhesive 116 to form a secure and hermetically sealed engagement between each corner bracket 30 and the interior surface 62 of the outer wrapper 20. This engagement also serves to secure a channel portion 66 of each corner bracket 30 in alignment with the remainder of the perimetrical breaker channel 24 of the outer wrapper 20. This engagement serves to define or fully define the perimetrical breaker channel 24 within which the wrapper channel 54 of the trim breaker 34 can seat. In addition to the channel portion 66, each corner bracket 30 can include a structural body 68 that engages a plurality of interior surfaces 62 defined within the outer corner 32 of the outer wrapper 20.

By way of example, and not limitation, when various aspects of the outer wrapper 20 are formed, a flat wrapper pattern 80 that is stamped within a metallic sheet that can be folded upward to form the various contours of the outer wrapper 20. In such an embodiment, each edge and the portions of the perimetrical breaker channel 24 within each edge of the outer wrapper 20 can be formed from a separate wing 82 defined within the flat wrapper pattern 80. As these wings 82 are folded upward, a seam 84 is formed along each outer corner 32 where two adjacent wings 82 of the flat wrapper pattern 80 engage one another. It is contemplated that each corner bracket 30 engages various interior surfaces 62 of each of these wings 82 to reinforce the outer corner 32 of the outer wrapper 20 and also reinforce the perimetrical breaker channel 24 of the outer wrapper 20.

According to the various embodiments, as exemplified in FIGS. 5-11, the adhesive 116 disposed within the adhesion grooves 64 of each corner bracket 30 can be deposited proximate the seam 84 to fill and seal and potentially hermetically seal each of these seams 84 to form secure connections between each of the wings 82 that form the outer corners 32 of the outer wrapper 20. To further reinforce the seam 84 between the adjacent wings 82 of the flat wrapper pattern 80, the seam 84 can be further sealed through a secondary process to re-strike each outer corner 32 of the outer wrapper 20 and close any visible gaps that appear as a result of the seam 84. Such re-striking process can be performed through pinching, welding, grinding, adhering, combinations thereof, and other similar methods that can close and seal the seam 84 to make the seam 84 substantially air-tight and unnoticeable. Accordingly, the outer wrapper 20 can appear as a substantially monolithic member, lacking visible seams 84 within portions of the exterior surface 86 of the outer wrapper 20.

Referring again to FIGS. 1-10, it is contemplated that the operable panel 10 described herein can include a panel for a rotationally operable door 14 that can include a hinge assembly 90 that is attached to the outer wrapper 20, the trim breaker 34 and/or the inner liner 26. It is contemplated that the hinge assembly 90 can extend from the operable panel 10, and typically the outer wrapper 20 and extend to a cabinet structure 92 of the appliance 12. It is contemplated that such a hinge assembly 90 can be attached to a reinforcing structure disposed proximate the interior surface 62 of the outer wrapper 20 that substantially prevents deflection at the outer wrapper 20 and other portions of the operable panel 10 during use of the appliance 12. It is contemplated that the operable panel 10 can be a panel for a drawer 16 where a drawer glide assembly 94 is attached to at least one of the inner liner 26 and the outer wrapper 20. In such an embodiment, the drawer glide assembly 94 can be adapted to extend from the operable panel 10 to a portion of the cabinet structure 92 to secure the operable panel 10 thereto. As with the hinge assembly 90, the drawer glide assembly 94 can include a reinforcing structure disposed proximate the interior surface 62 of the outer wrapper 20 to prevent bending, warping and other deflection of the operable panel 10 during use of the appliance 12.

Referring again to FIGS. 2-6, it is contemplated that an insulation material 100 can be disposed within the insulating cavity 28 defined between the inner liner 26, the outer wrapper 20 and trim breaker 34 extending therebetween. Various insulation materials 100 can be included within the insulating cavity 28. Such insulating materials can include, but are not limited to, microspheres, nanospheres, silica-type materials, granulated insulation material, powder-based insulation material, foam insulation, vacuum insulated panels, combinations thereof, other similar insulating materials. It is also contemplated that the engagement between the outer wrapper 20, the inner liner 26, and the trim breaker 34 can form a substantially hermetic seal. This hermetic seal can allow for the expression or expulsion of gas from within the insulating cavity 28 such that the operable panel 10 can be manufactured to include an at least partial vacuum within the insulating cavity 28 to define the operable panel 10 as a self-contained vacuum insulation structure. In such an embodiment, a vacuum port may be disposed within a portion of the operable panel 10 such that gas can be expressed or expelled through the vacuum port and sealed to maintain the at least partial vacuum within the insulating cavity 28.

Referring again to FIGS. 1-10, it is contemplated that the inner liner 26 can be formed from a first metallic sheet 110 that is stamped into a flat liner pattern 112, or stamped into the shape of a metallic inner liner 26 for use in the operable panel 10. It is also contemplated that the inner liner 26 can be formed from the plastic-type material that can be molded, stamped, or otherwise formed into the shape of the inner liner 26. The outer wrapper 20 can also be made of various materials that can include, but are not limited to, metal, plastic, combinations thereof and other similar materials. Typically, the outer wrapper 20 will be formed from a second metallic sheet 114 such that the inner liner 26 and outer wrapper 20 are each metallic sheets that form the operable panel 10. The trim breaker 34 can be in the form of an injection molded piece that is injection molded around portions of the inner liner 26 and the outer wrapper 20.

According to the various embodiments, as exemplified in FIGS. 1-10, it is also contemplated that the trim breaker 34 can be a separately molded plastic member that can be attached to the inner liner 26 and outer wrapper 20 through adhesives 116, welding, or other similar process to secure the trim breaker 34 to the inner liner 26 and outer wrapper 20. It is contemplated that when the trim breaker 34 is attached to the outer wrapper 20, an adhesive 116 can be placed within the perimetrical breaker channel 24 and the wrapper channel 54 of the trim breaker 34 can be set within the perimetrical breaker channel 24 and secured therein through the adhesive 116. The adhesive 116 used in attaching the trim breaker 34 to the inner liner 26 and outer wrapper 20 can assist in forming the hermetic seal of the operable panel 10. It is also contemplated that in forming the inner liner 26 and/or outer wrapper 20, at least one wrapper wall 120 or liner wall 122 can be in an injection molded member (shown in FIG. 12) that defines at least a portion of the inner liner 26 and/or the outer wrapper 20 and also serves to define a portion of the trim breaker 34 extending therebetween. In order to increase and strengthen the engagement between the trim breaker 34 an the inner liner 26 and/or the outer wrapper 20, the trim breaker 34 can include an elongated flange 124 (shown in FIG. 13) that provides a more extensive surface engagement between the trim breaker 34 and at least one of the inner liner 26 and the outer wrapper 20. This added surface engagement can serve to enhance the hermetic seal defined by the operable panel 10 such that a more complete vacuum can be defined within the insulating cavity 28 of the operable panel 10.

Referring now to FIGS. 1-15, having described various aspects of the operable panel 10 and construction thereof, a method 400 is disclosed for forming a structural panel for an appliance 12. According to the method 400, a first metallic sheet 110 can be stamped into the shape of a flat liner pattern 112 that corresponds to the inner liner 26 of an appliance 12 (step 402). The flat liner pattern 112 can include various geometries that can correspond to a plurality of liner walls 122 and a perimetrical liner tab 130, where the perimetrical liner tab 130 can be adapted to engage with a liner channel 36 at the trim breaker 34 during assembly of the operable panel 10. Once the flat liner pattern 112 is formed, the flat liner pattern 112 can be shaped into the shape of the inner liner 26 (step 404).

Figure 15:
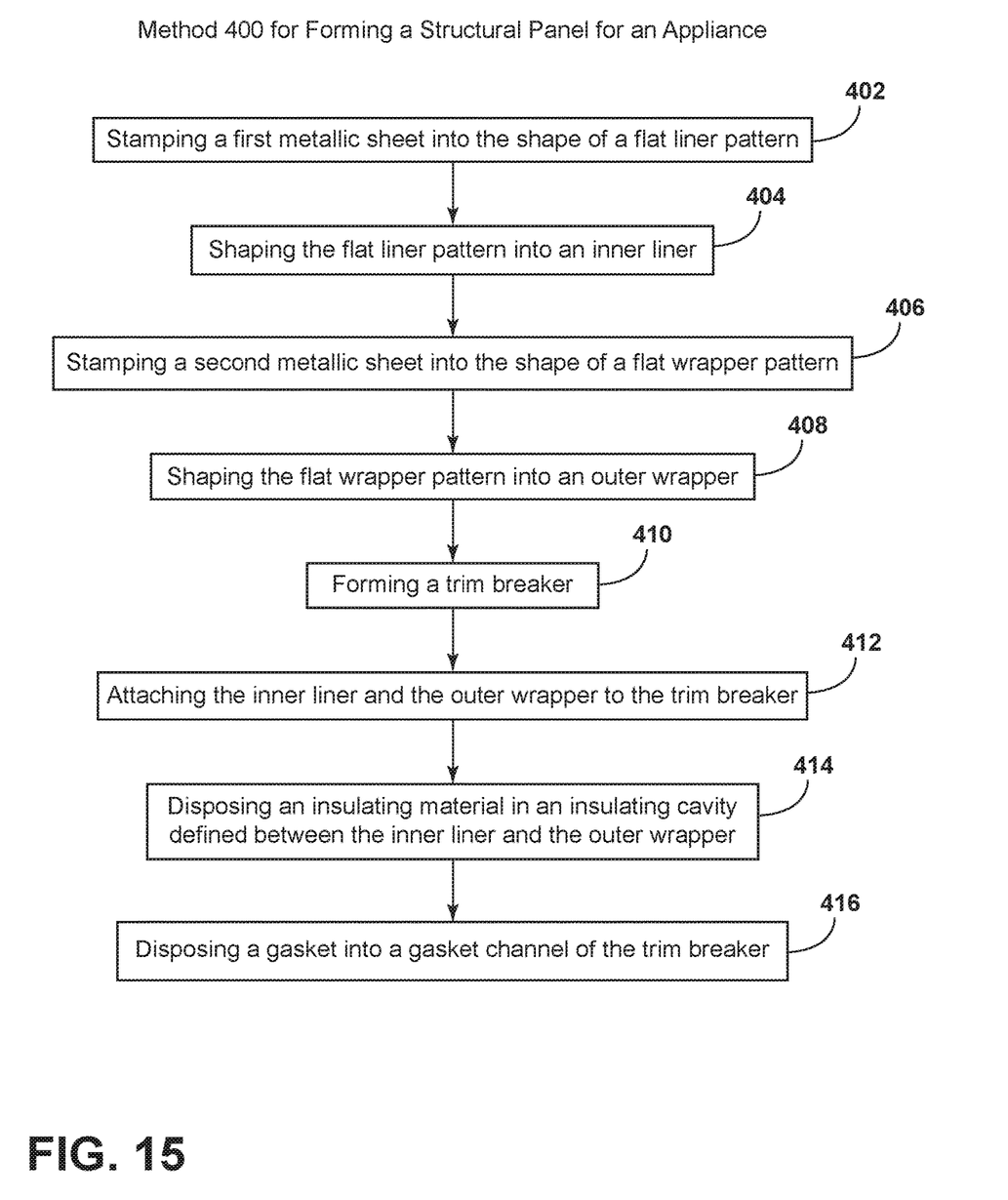
FIG. 15 is a schematic linear flow diagram illustrating a method for forming a vacuum insulated structure for an appliance.
Figure 16:
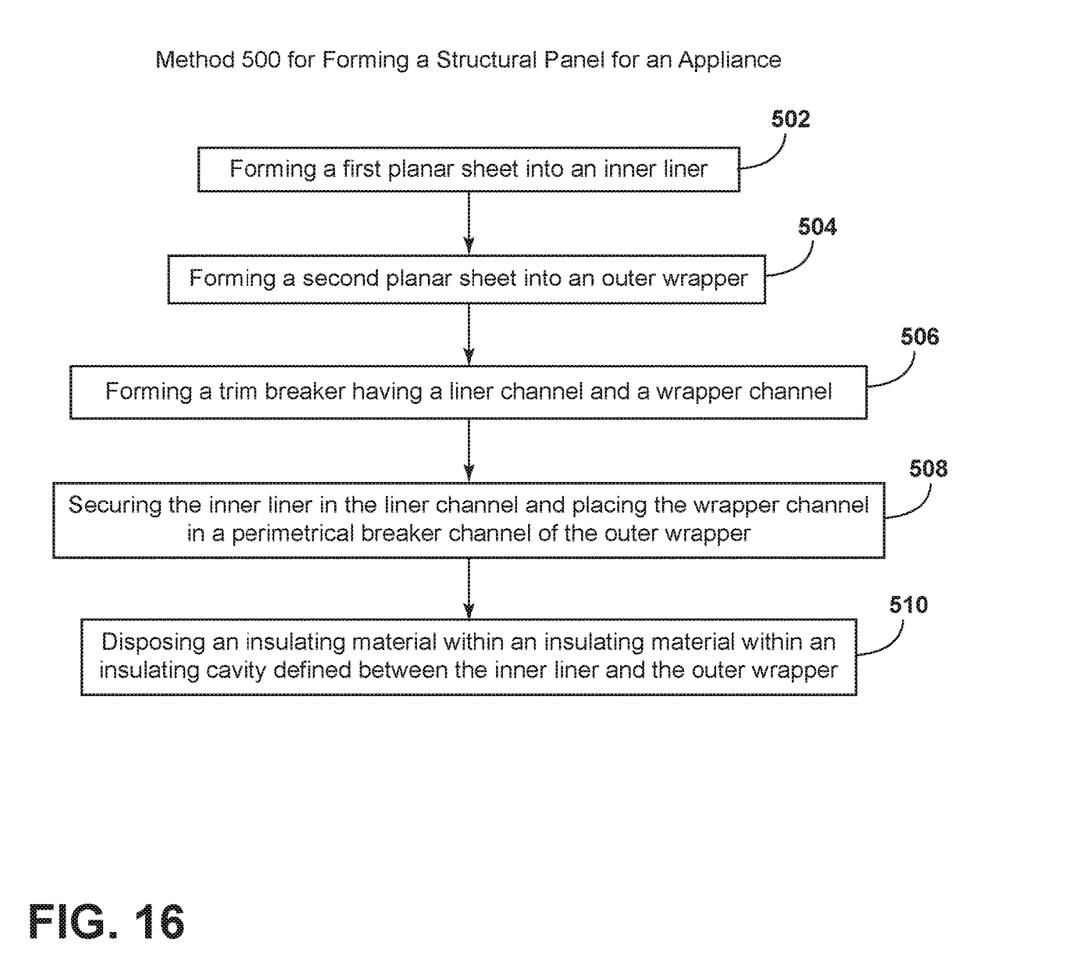
FIG. 16 is a schematic linear flow diagram illustrating a method for forming a vacuum insulated structure for an appliance.

According to the various embodiments, it is contemplated that the inner liner 26 can be stamped directly into the shape of an inner liner 26, or at least a portion of the inner liner 26, without necessarily including the step of forming the flat liner pattern 112 through a separate stamping process. Typically, where the liner pattern 112 is directly stamped into the shape of the inner liner 26, the material of the inner liner 26 is a more flexible and pliable material such as plastic, polymers and other similar materials that can be stamped without significant wrinkling, bunching or other unwanted deformations.

Referring again to FIGS. 1-15, according to the method 400, a second metallic sheet 114 can be stamped into a flat wrapper pattern 80 that corresponds to an outer wrapper 20 for an appliance 12 (step 406). As discussed above, the outer wrapper 20 includes a plurality of wrapper walls 120 and a perimetrical wrapper edge 22. It is contemplated that the perimetrical wrapper edge 22 can define at least part of the perimetrical breaker channel 24 that receives the wrapper channel 54 of the trim breaker 34. Once the flat wrapper pattern 80 is formed, the flat wrapper pattern 80 can be shaped into the form of the outer wrapper 20 (step 408).

Figure 11:
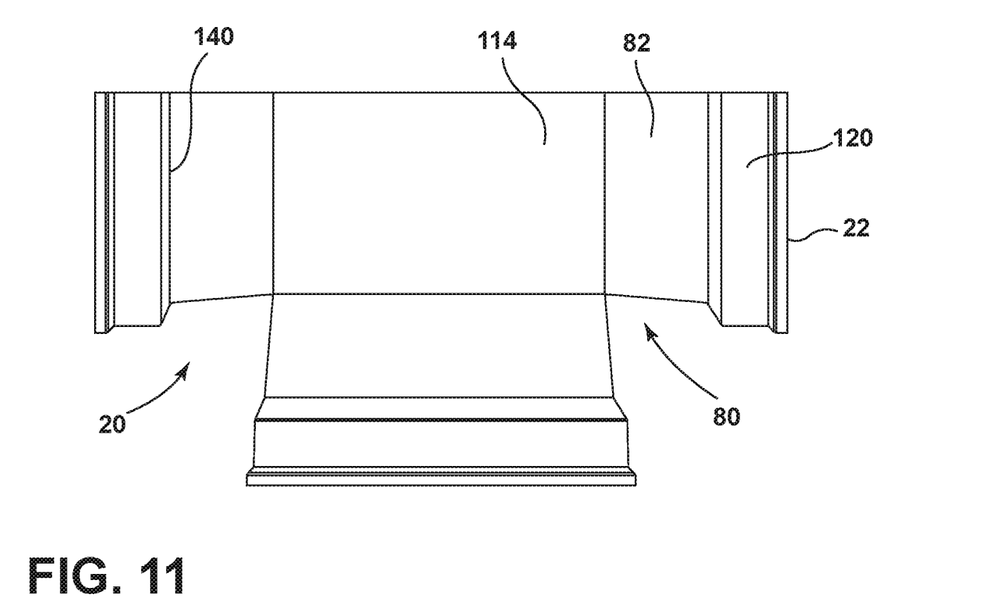
FIG. 11 is a plan view of an aspect of a stamped metallic panel including guide lines that can be shaped to form an aspect of an outer wrapper of an operable panel for an appliance.

According to the various embodiments and aspects of the various methods, the steps of stamping first and second metallic sheets 110, 114 into the flat liner pattern 112 and flat wrapper pattern 80, respectively, can include disposing guide lines 140 within the flat liner and flat wrapper patterns 112, 80. It is contemplated that these guide lines 140 can correspond to edges and corners of the plurality of liner walls 122 and edges of the plurality of wrapper walls 120. The use of guide lines 140 can also assist in the forming step of the inner liner 26 and outer wrapper 20, such that clean and precise edges can be formed as the inner liner 26 and outer wrapper 20 are folded into their respective final shapes.

Referring again to FIGS. 1-15, according to the method 400, a trim breaker 34 is formed, where the trim breaker 34 includes a liner channel 36 and wrapper channel 54 (step 410). After the trim breaker 34 is formed, the perimetrical liner tab 130 and the perimetrical wrapper edge 22 can be secured to the liner and wrapper channels 36, 54 of the trim breaker 34, respectively (step 412). According to the various embodiments, it is contemplated that the trim breaker 34 can be preformed and the inner liner 26 and outer wrapper 20 can be adhered, welded, or otherwise secured to the trim breaker 34. It is also contemplated that the trim breaker 34 can be injection molded around portions of the inner liner 26 and outer wrapper 20 to form a secure structure between these components.

According to various embodiments, it is contemplated that portions of the inner liner 26 and/or outer wrapper 20 can include injection molded or separately formed plastic components that can be integrated with the trim breaker 34 and attached to portions of the inner liner 26 and outer wrapper 20.

Figure 12:
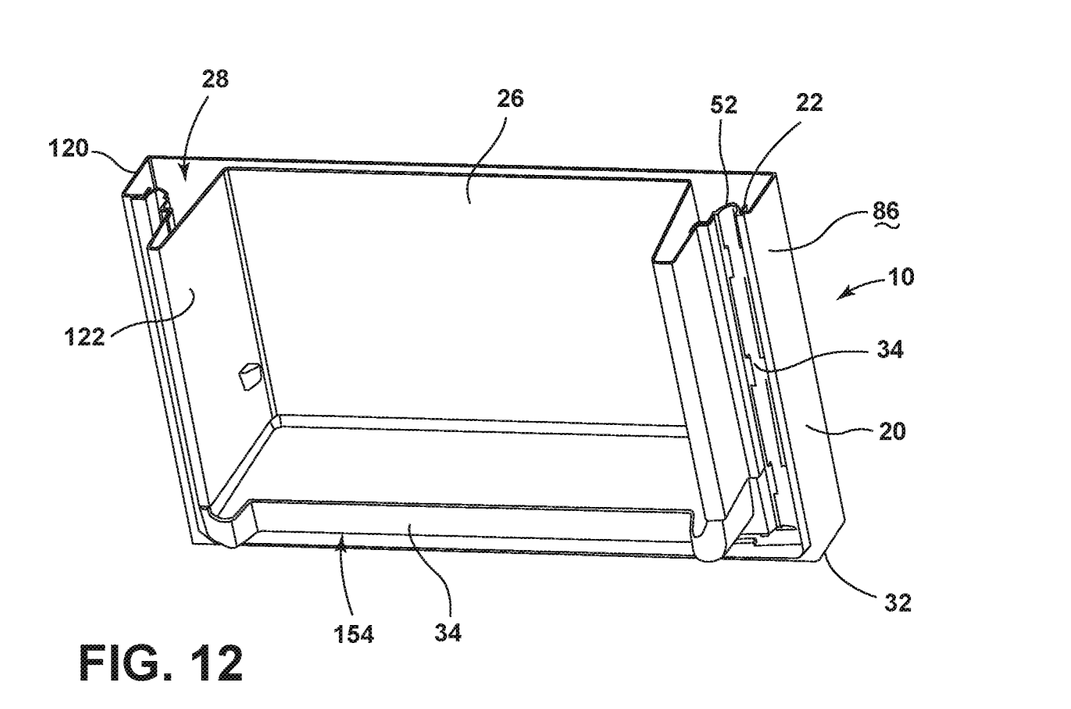
FIG. 12 is a cross-sectional view of an aspect of an operable panel incorporating a stamped inner liner that includes an injection molded portion proximate a trim breaker.
Figure 13:
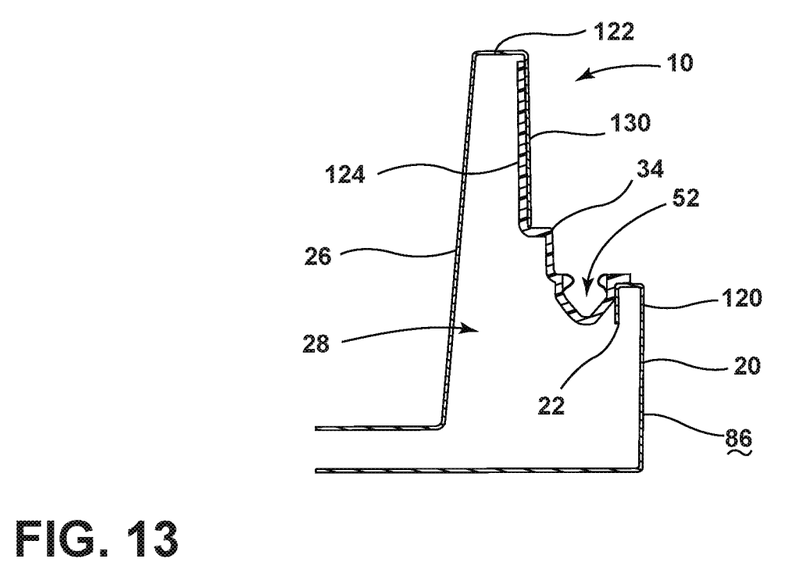
FIG. 13 is a schematic cross-sectional view of an aspect of the operable panel for an appliance exemplifying an aspect of a trim breaker having elongated legs.
Figure 14:
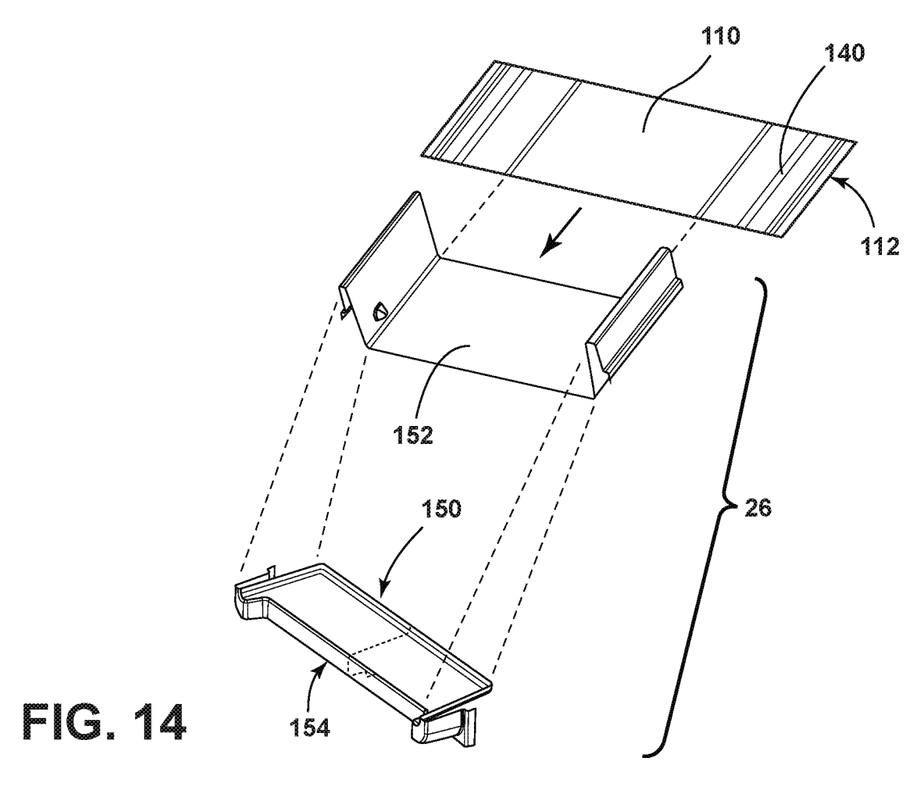
FIG. 14 is a partially exploded view of an aspect of an inner liner for an operable panel for an appliance showing a stamped inner liner and an injection molded end piece.

As exemplified in FIGS. 12 and 14, the inner liner 26 can include an elongated band that is stamped or otherwise shaped into a profile of the inner liner 26. At least one of a top and bottom cap 150 of the inner liner 26 can be either injection molded or premolded and attached to the stamped portion of the inner liner 26 to fully define the shape of the inner liner 26. It is contemplated that this injection molded portion of the inner liner 26 can either be attached to the trim breaker 34 or can be injection molded as part of the trim breaker 34. In such an embodiment, the stamped portion of the inner liner 26 can define a main body 152 of the inner liner 26. The end portions 154 of the inner liner 26, which may be injection molded or otherwise formed from plastic or other polymer-type material, can be a cap 150 attached to the end portions 154 of the main body 152 of the inner liner 26. It is also contemplated that the cap 150 attached to the main body 152 of the inner liner 26 can be in the form of a sheet member made of metal and/or plastic that is adhered to the edge of the main body 152 of the inner liner 26. Accordingly, the caps 150 can be in the form of a two-dimensional or three-dimensional shape that can be attached to the main body 152 of the inner liner 26.

According to the various embodiments, it is contemplated that the trim breaker 34 can be injection molded, overmolded or otherwise formed to only one of the inner liner 26 and the outer wrapper 20. The other of the inner liner 26 and outer wrapper 20 can then be adhered, fastened, or otherwise attached to the trim breaker 34 to form the operable panel 10. By way of example, and not limitation, the trim breaker 34 can be overmolded onto a portion of the inner liner 26 proximate the perimetrical liner tab 130. The outer wrapper 20 can then be adhered to the trim breaker 34 through the engagement of the wrapper channel 54 of the trim breaker 34 and the perimetrical breaker channel 24 of the outer wrapper 20.

Referring again to FIGS. 1-15, an insulation material 100 can be disposed within the insulating cavity 28 formed within the inner liner 26 and the outer wrapper 20 (step 414). Once the operable panel 10 is substantially formed, a gasket 50 can be disposed within a gasket channel 52 of the trim breaker 34, where the gasket channel 52 is disposed proximate the wrapper channel 54 of the trim breaker 34 (step 416).

Referring again to FIGS. 7-10, according to various aspects of the method 400, as the flat wrapper pattern 80 is shaped, various corner brackets 30 can be disposed against an interior surface 62 of the outer wrapper 20 at each outer corner 32, respectively. It is contemplated that the outer wrapper 20 and corner brackets 30 cooperate to define the perimetrical channel of the outer wrapper 20. During formation of the outer wrapper 20, the corner brackets 30 can be positioned on the flat wrapper pattern 80 and then the flat wrapper pattern 80 can be formed around the brackets. Alternatively, the outer wrapper 20 can be formed and then the corner brackets 30 can be disposed in the outer corners 32 of the pre-formed outer wrapper 20. It is further contemplated that the corner brackets 30 can be pre-formed to a desired shape, or can be injection molded within the outer corners 32 of the outer wrapper 20. Where the corner brackets 30 are pre-formed, an adhesive 116 is typically included within the adhesion grooves 64 defined within the engagement surface 60 of each corner bracket 30, as described above.

Referring again to FIG. 10, various aspects of the method can include a step of sealing the outer corners 32 proximate the outer wrapper 20 of the corner brackets 30. In such an embodiment, two distinct edges of the flat wrapper pattern 80 defined by wings 82 of the flat wrapper pattern 80 can define a seam 84 at each outer corner 32. It is contemplated that the corner brackets 30 can be entirely disposed within the insulating cavity 28 to support the outer corner 32 of the outer wrapper 20 during sealing of each outer corner 32. As discussed above, sealing the outer corners 32 can include welding, striking, the use of adhesives 116, combinations thereof, and other similar methods that can seal two adjacent wings 82 of the flat wrapper pattern 80.

Referring now to FIGS. 1-14 and 16, a method 500 is disclosed for forming a structural panel for an appliance 12. According to the method 500, a first planar sheet is formed into the shape of an inner liner 26 (step 502). As discussed above, the first planar sheet can be metallic, plastic, other polymer-type material, combinations thereof, and other similar materials that can be used to shape the inner liner 26. The exact forming process used to form the inner liner 26 can depend upon the material of the first planar sheet. A second planar sheet is formed into the shape of an outer wrapper 20 (step 504). As discussed above, the outer wrapper 20 can include a plurality of wrapper walls 120 and a wrapper edge 22 that at least partially defines the perimetrical breaker channel 24. Typically, the second planar sheet will be a metallic panel that is stamped and then folded into the shape of the outer wrapper 20. It is contemplated that other materials can be used to form the outer wrapper 20, such as plastic, other polymer materials, composites, combinations thereof, and other similar panel-forming materials. Once the inner liner 26 and outer wrapper 20 are formed, a trim breaker 34 is formed having a liner channel 36 for receiving a portion of the inner liner 26 and a wrapper channel 54 for seating within the perimetrical breaker channel 24 (step 506). The inner liner 26 is then secured within the liner channel 36 and the wrapper channel 54 is placed within the perimetrical breaker channel 24 (step 508). An insulation material 100 is also disposed within the insulating cavity 28 formed between the inner liner 26 and outer wrapper 20 (step 510). It is contemplated that the insulation material 100 can be disposed within the insulating cavity 28 at various steps within the formation of the operable panel 10. It is contemplated that the operable panel 10 can be manufactured to include an insulation port through which insulation material 100 can be disposed after the inner liner 26, outer wrapper 20 and trim breaker 34 are attached together to form the structure of the operable panel 10. It is also contemplated that the insulation material 100 can be disposed within the outer wrapper 20 and then the trim breaker 34 and inner liner 26 can be attached to the outer wrapper 20 to contain the insulation material 100 within the now-formed insulating cavity 28.

According to the various embodiments, the various aspects of the operable panel 10 and the various aspects of the methods described herein can be used to form operable panels 10 for various appliances 12. Such appliances 12 can include, but are not limited to, refrigerators, freezers, dishwashers, laundry appliances, ovens, coolers, water heaters, and other similar appliances 12 that include an insulation system.

As discussed above, the inner liner 26, outer wrapper 20 and trim breaker 34 can be made of various materials that can be stamped, formed, folded or otherwise shaped into the final form of the operable panel 10. It is contemplated that the exact material used for these components can dictate the methods and sequence of steps that may be used to form the inner liner 26, outer wrapper 20 and trim breaker 34. Where a metallic sheet is used for the inner liner 26 and/or outer wrapper 20, the metallic sheet will typically be stamped into a particular pattern and then the pattern will be bent or otherwise shaped into the final form or substantially the final form of the inner liner 26 and/or outer wrapper 20. It is contemplated that these operations can be used in conjunction with various plastic forming, injection molding, overmolding or plastic attaching processes that can fully form the shape of the inner liner 26 and/or the outer wrapper 20. Where the inner liner 26 and/or outer wrapper 20 are formed of plastic, a single stamping, heat forming, molding, or other shaping process can be used to form the inner liner 26 and/or outer wrapper 20. Such plastic materials can be shaped, bent, or otherwise formed more easily and without the occurrence of wrinkling, pinching or other unwanted physical features occurring within the inner liner 26 and/or the outer wrapper 20.

It will be understood by one having ordinary skill in the art that construction of the described device and other components is not limited to any specific material. Other exemplary embodiments of the device disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the device as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present device. The exemplary structures and processes disclosed herein are for illustrative purposes and are not to be construed as limiting.

It is also to be understood that variations and modifications can be made on the aforementioned structures and methods without departing from the concepts of the present device, and further it is to be understood that such concepts are intended to be covered by the following claims unless these claims by their language expressly state otherwise.

The above description is considered that of the illustrated embodiments only. Modifications of the device will occur to those skilled in the art and to those who make or use the device. Therefore, it is understood that the embodiments shown in the drawings and described above is merely for illustrative purposes and not intended to limit the scope of the device, which is defined by the following claims as interpreted according to the principles of patent law, including the Doctrine of Equivalents.

What is claimed is:

1. An operable panel for an appliance, the operable panel comprising:
    a metallic outer wrapper having a perimetrical wrapper edge that partially defines a perimetrical breaker channel;
    an inner liner;
    a plurality of corner brackets disposed at respective corners of the perimetrical wrapper edge, each corner bracket defining the perimetrical breaker channel at the respective corners and cooperating with the perimetrical wrapper edge to fully define the perimetrical breaker channel;
    a trim breaker adhered to the metallic outer wrapper and the plurality of corner brackets at the perimetrical breaker channel and having a liner channel that receives a portion of the inner liner, the trim breaker extending between the inner liner and the metallic outer wrapper; and
    an insulation material disposed within an insulating cavity defined between the inner liner and the metallic outer wrapper.

2. The operable panel of claim 1, further comprising:
    a gasket disposed within a gasket channel of the trim breaker, wherein the gasket channel is positioned proximate a wrapper channel that seats within the perimetrical breaker channel of the metallic outer wrapper.

3. The operable panel of claim 2, wherein the trim breaker includes a U-shaped channel, wherein one surface of the U-shaped channel defines the wrapper channel and an opposing surface of the U-shaped channel defines the gasket channel.

4. The operable panel of claim 1, wherein each corner bracket includes an engagement surface that defines a plurality of adhesion grooves that retain an adhesive therein, and wherein the adhesive at least partially secures the corner bracket to an interior surface of the metallic outer wrapper.

5. The operable panel of claim 2, wherein the perimetrical breaker channel is defined within the perimetrical wrapper edge, and wherein the wrapper channel of the trim breaker seats within the perimetrical breaker channel of the metallic outer wrapper.

6. The operable panel of claim 1, wherein the plurality of corner brackets are entirely disposed within the insulating cavity.

7. The operable panel of claim 1, wherein the plurality of corner brackets are injection molded to the metallic outer wrapper.

8. The operable panel of claim 1, wherein the metallic outer wrapper includes at least one wrapper wall that is injection molded to define at least a portion of the trim breaker.

\* \* \* \* \*